June 24, 1930. J. CAMPBELL 1,766,742

GRAIN DRYING DEVICE

Filed Sept. 23, 1929

J. Campbell
Inventor
Attorney

Patented June 24, 1930

1,766,742

UNITED STATES PATENT OFFICE

JOSEPH CAMPBELL, OF MILNER, BRITISH COLUMBIA, CANADA

GRAIN-DRYING DEVICE

Application filed September 23, 1929, Serial No. 394,616, and in Canada July 20, 1929.

This invention relates to a grain drying device more particularly for use by farmers but equally applicable in other and more general directions.

Its object is to improve the average quality of stored grain and also incidentally to prevent possible deterioration arising on account of enclosed moisture in any particular portion of the mass and especially in the lower strata of grain while in storage.

It is obvious that a quantity of stored grain presents in the mass a cellular formation due to the innumerable contiguous interstices all more or less connected and forming an attenuated atmospheric path.

This condition I take advantage of to pass through the mass a large number of jets of dry air by means of a perforated pipe device of convenient form which is more clearly described by the aid of the drawings accompanying and forming a part of this application, and in which.

Figures 1, 2, 3, 4:
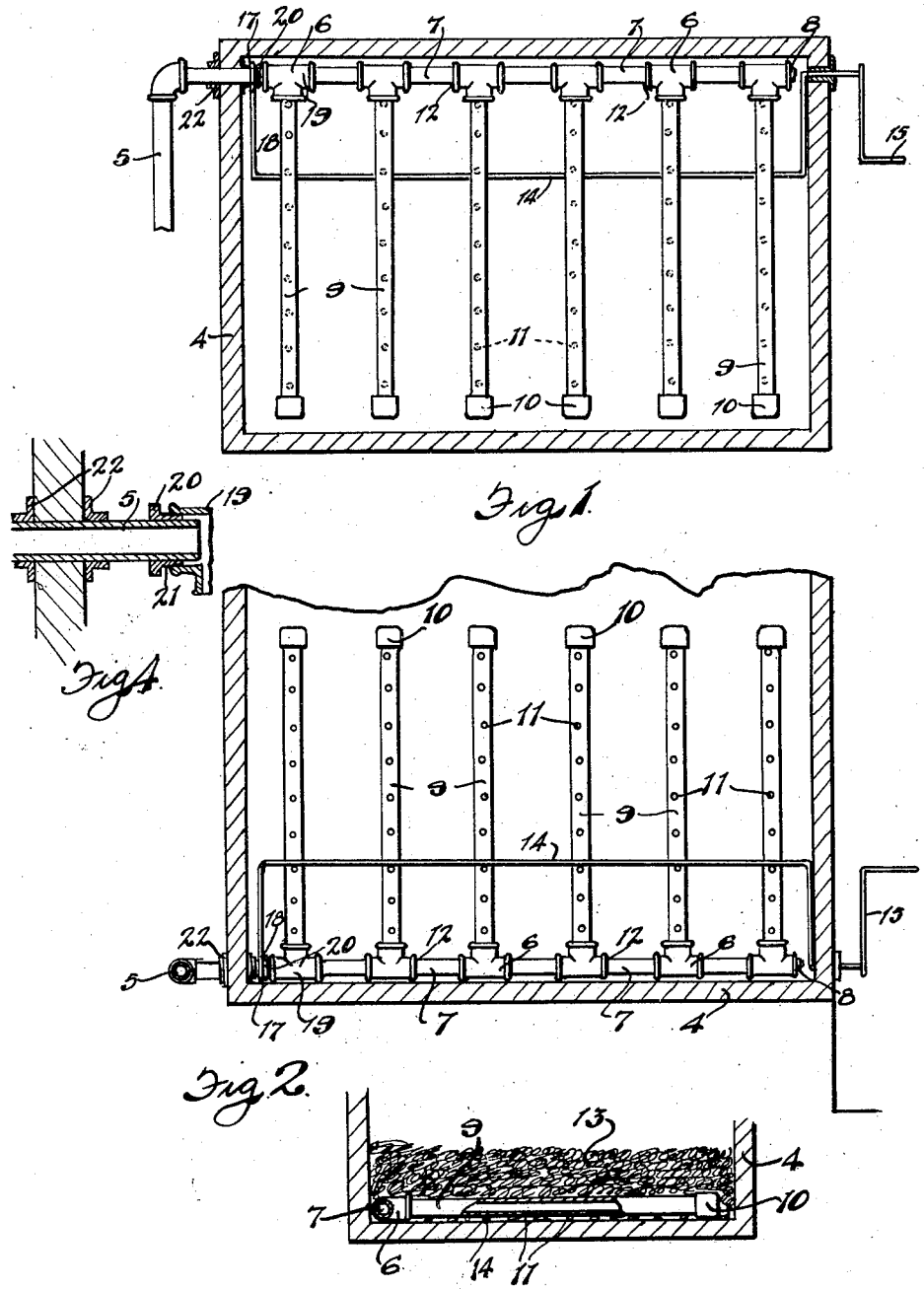
Figure 1 is a plan of the apparatus in position in a grain storage bin such as might be found on any farm premises.
Figure 2 is a vertical cross section of Figure 1 but showing the perforated pipes raised to the vertical position for the purpose of emptying and cleaning the bin.
Figure 3 is a transverse vertical section showing the perforated pipes in position below the stored grain.
Figure 4 is an enlarged detail of the intake end of the main air pipe.

In these drawings the numeral 4 indicates the wall or floor of a grain bin as frequently constructed of stout timber; 5 is a pipe connecting with a source of dry air delivered under suitable pressure.

The device is conveniently constructed of standard pipe-work using T connectors 6 connected together by the nipples 7 and having the terminal aperture plugged as at 8.

Into each T piece 6 is screwed a length of pipe 9 capped at its extremity 10 and perforated as shown at 11.

The pipes 9 are arranged to lie on the floor of the bin as shown, and are adapted to pivot at the screw-thread joint 12 there being no necessity for a pressure-tight joint at that part.

Grain is filled into the bin above the pipes as indicated at 13, and dry air is conveyed to the system of pipe-work through the pipe connection 5 under a suitable pressure whereby it is adapted to impinge the floor of the bin by numerous jets and thence to gradually percolate upwards through the mass of grain to escape at its upper surface, carrying with it all the moisture within the mass which it can absorb in transit and thereby leaving the entire quantity of grain in an equable hygroscopic condition with a minimum of included moisture measurably dependent on the state of the air passed through it.

The device in its simpler form permits the lifting of any undivided pivotal perforated pipe for clearing purposes and for the purpose of the smaller class of farmers this fulfills every requirement.

Should it be desired in the case of larger installations to simultaneously raise the perforated pipes simple means for effecting this are indicated in the drawings where the crank bar 14 passing below the perforated pipes and connected to the short crank shaft 15 and the hand crank 16 is supported at the far end 17 by a loop at 18 around the supply pipe 5. When this arrangement is used the end T connector 19 is used to form the simple stuffing box 20 receiving the gland 21 so that the intake air pipe may be held in the bearings 22 while the air distributing system swivels around it actuated simultaneously by the crank bar 14.

Having now fully described my invention, I hereby declare that what I claim and desire to be protected in by Letters Patent, is:

1. A grain drying device in combination with a grain storage bin comprising, a main distributing pipe consisting of a consecutive series of T-shaped pipe connectors united by nipples of the nature of short lengths of pipe to form a main supply member, each said connector being movable about the axis of said main pipe, pipes having a series of small perforations spaced apart and extending throughout their lengths one of said pipes being secured to each said branch connector and movable with it, whereby a series of pipes disposed in parallelism is made available, said main pipe being connected to a source of dry air under pressure, whereby the floor surface of said bin may be impinged by a numerous series of spaced air jets and numerous air currents distributed amongst the stored grain to percolate through it and absorb the moisture enclosed therein and whereby said perforated pipes may be pivotally raised from the horizontal floor surface to the vertical for the purpose of clearing the said bin.

2. A grain drying device in combination with a grain storage bin comprising, a main distributing pipe consisting of a consecutive series of T-shaped pipe connectors united by nipples of the nature of short lengths of pipe to form a main supply member, each said connector being movable about the axis of said main pipe, pipes having a series of small perforations spaced apart and extending throughout their lengths one of said pipes being secured to each said branch connector and movable with it, whereby a series of pipes disposed in parallelism is made available, said main pipe being connected to a source of dry air under pressure, whereby the floor surface of said bin may be impinged by a numerous series of spaced air jets and numerous air currents distributed amongst the stored grain to percolate through it and absorb the moisture enclosed therein and whereby said perforated pipes may be pivotally raised from the horizontal floor surface to the vertical for the purpose of clearing the said bin, and means for simultaneously raising and lowering the said movable perforated pipes from the horizontal to the vertical position and vice versa.

In testimony whereof I affix my signature.

JOSEPH CAMPBELL.